(12) United States Patent
Stichert et al.

(10) Patent No.: US 7,147,109 B2
(45) Date of Patent: Dec. 12, 2006

(54) SIEVE DEVICE FOR SCREENING SOLID MATERIAL

(75) Inventors: Wolfram Stichert, Ziegelhausen (DE); Mario Hermann, Laudenbach (DE); Frank Guellich, Heidelberg (DE)

(73) Assignee: hte Aktiengesellschaft the high throughput experimentation company, Heidelberg (DE)

( * ) Notice: Subject to any disclaimer, the term of this patent is extended or adjusted under 35 U.S.C. 154(b) by 138 days.

(21) Appl. No.: 10/483,871

(22) PCT Filed: Jul. 17, 2002

(86) PCT No.: PCT/EP02/07969

§ 371 (c)(1),
(2), (4) Date: Feb. 23, 2004

(87) PCT Pub. No.: WO03/008112

PCT Pub. Date: Jan. 30, 2003

(65) Prior Publication Data

US 2004/0206671 A1    Oct. 21, 2004

(30) Foreign Application Priority Data

Jul. 18, 2001   (DE) ............................... 101 34 871

(51) Int. Cl.
    *B07B 1/28*    (2006.01)
(52) U.S. Cl. .................. 209/315; 209/353; 209/355; 209/311; 209/403; 209/405

(58) Field of Classification Search ............... 209/353, 209/259, 355, 370, 371, 311, 315, 319, 399, 209/395, 403
See application file for complete search history.

(56) References Cited

U.S. PATENT DOCUMENTS

| | | | |
|---|---|---|---|
| 3,319,792 A | | 5/1967 | Leder |
| 3,796,188 A | * | 3/1974 | Bradstreet .................... 119/166 |
| 5,222,605 A | * | 6/1993 | Pogue ......................... 209/239 |
| 5,261,540 A | | 11/1993 | Sijsling |
| 6,852,289 B1 | * | 2/2005 | Gordon et al. .............. 422/101 |

FOREIGN PATENT DOCUMENTS

| | | |
|---|---|---|
| EP | 0521192 A | 1/1993 |
| EP | 0642844 | 4/1998 |
| WO | WO 95 01559 | 1/1995 |
| WO | WO 99/20396 | 4/1999 |
| WO | WO 02/04121 | 1/2002 |

OTHER PUBLICATIONS

PCT International Search Report, Nov. 20, 2002, hte Aktiengesellschaft.

* cited by examiner

*Primary Examiner*—Kathy Matecki
*Assistant Examiner*—Terrell Matthews
(74) *Attorney, Agent, or Firm*—Jones Day

(57) ABSTRACT

The present invention relates to a sieve device for screening at least two solid substances preferably different from each other comprising at least one sieve module (1), comprising at least two sieve devices (2), comprising at least one fitting (3) with a bottom with sieve (4), closing the respective fitting (3).

13 Claims, 10 Drawing Sheets

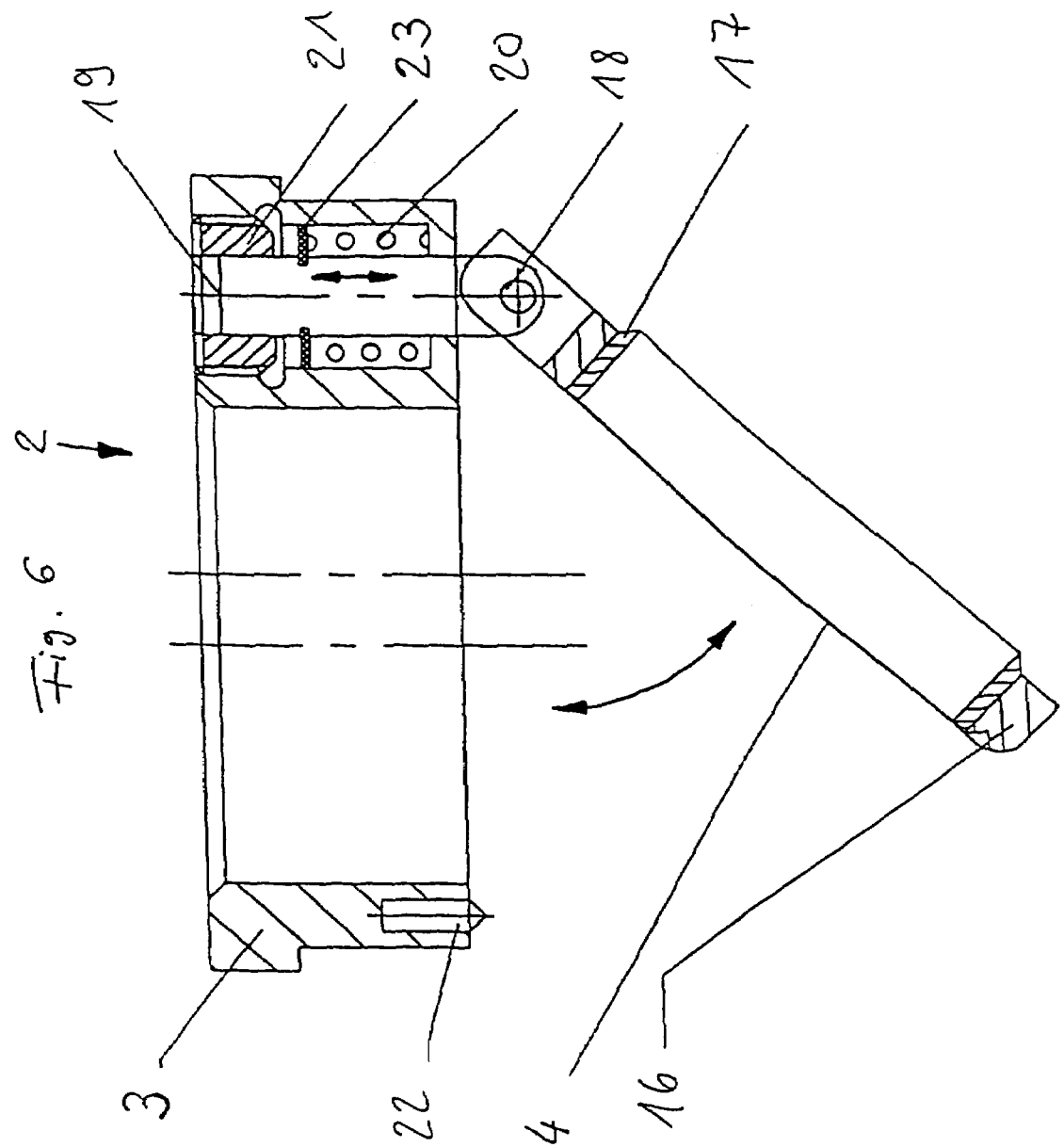

SIEVE DEVICE FOR SCREENING SOLID MATERIAL

The present invention relates to a sieve device for screening at least two solid substances, preferably differing from one each other, by means of sieve modules, comprising at least two sieve devices. Moreover, it relates to a method for screening of solid substances in using such sieve devices as well as to a method for producing supported building blocks comprising the aforementioned screening method.

The present invention relates to the technical field of high throughput material research, in particular the high throughput catalyst research. It is known that the use of such high throughput methods can significantly increase the efficiency or performance for trying to find new materials for certain purposes. Therein, it is important, among others, to increase the production speed significantly already when producing the corresponding materials, e.g. when producing heterogeneous catalysts, wherein it is particularly important to reproduce production conditions and the implementation thereof and to obtain precisely defined products. This is necessary for, e.g., the production of heterogeneous catalysts since the subsequent catalyst testing can only result in reliable test conditions if the heterogeneous catalysts are used in a well-defined particle size or in a certain defined range of particle sizes. Therefore, it is advantageous to also produce the materials, on which the heterogeneous catalyst is based, in parallel, preferably fully automated in parallel.

E.g. for producing carrier materials for heterogeneous catalysts such as $SiO_2$, $Al_2O_3$, $TiO_2$, the carrier materials are commonly poured through a series of sieves, stacked one upon the other, with various mesh sizes, clearly defined. The target fraction is provided with one or more active components, e.g. soaked, after screening and in accordance with a common method.

Substantially the same method is used for obtaining catalysts with a defined particle size in the case of catalysts produced by means of e.g. precipitation. Therein, the precipitant, dried and potentially calcined, is directly sieved, and the target fraction is then used for, e.g., a catalytic performance test. Such "classical" sieve modules, adapted for screening a solid substance, are prior art and are commercially distributed e.g. by the company Retsch. In this regard, we refer to the Retsch analysis sieve machine AS 200. This machine operates with round analysis sieves, being stacked on upon the other. A three-dimensional shaking movement starts the actual sieving process. Such sieving machines are described in e.g. U.S. Pat. No. 5,261,540 as well as EP-B 0 642 844.

The devices and methods described in the afore-cited documents merely refer to screening of one substance. When screening more than one substance within the framework of high throughput producing of materials, some requirements are inherently set, which cannot be solved by the sieve machines of the prior art, e.g. avoiding an undesired transfer of material form one sieve device into an adjacent sieve device. Another problem is the efficient filling of the target fractions of a certain product.

Moreover, it has to be taken into account that, in particular when producing precipitation catalysts in high throughput, the screening of the solid substances becomes the rate-determining step.

Thus, the present invention was based on the problem of providing a device and a method enabling a screening of solid substances as efficiently as possible and thus to significantly accelerate the parallel producing of e.g. heterogeneous or precipitation catalysts or to make it possible at all.

Thus, the present invention relates to a sieve device for screening at least two various solid substances that are different from each other, comprising at least one sieve module, provided with at least two sieve devices, each comprising a fitting with a bottom with a sieve, closing the respective fitting.

Moreover, the invention relates to a method for screening at least two solid substances, different from each other, comprising the applying of the solid substances into the sieve device and screening of the solid substances by means of a sieve device.

A "building block" is understood as a unit in the framework of the present invention, which may comprise one or more components or materials. The materials used are preferably non-gaseous substances such as e.g. solid substances, oxides, salts, brine, gels, wax-like substances or substance mixtures, dispersions, emulsions, suspensions. These may be molecular and non-molecular chemical compounds, formulations, mixtures, wherein the term "non-molecular" defines substances which can be continuously optimized or changed, as opposed to "molecular" substances, the structural shaping of which may only be amended through a variation of discrete states, e.g. by variation of a substitution pattern. A substance may also be a material, a component or a precursor-component, leading to a material.

In a "performance test", the building blocks are tested for the presence of performance characteristics. The term "performance characteristics" therein determines properties of the materials, preferably of a library of materials, which can be measured and which are determined by means of appropriate sensors.

With regard to the sieve modules used within the framework of the sieve device in accordance with the present invention, there are no limitations regarding their geometry and/or their material as long as these sieve modules comprise at least two sieve devices, as defined above. Thus, the sieve modules used in accordance with the present invention may have a round, square or rectangular outer shape. The sieve module can be made from plastics as well as from metal.

The sieve module comprises at least two sieve devices, preferably more than 10, more preferably more than 20 and in particular more than 40 sieve devices. Examples for sieve modules, which are good to use, are such with 24 or 48 sieve devices. Each sieve device has a fitting and a bottom with sieve closing this fitting. The sieves to be used are preferably mesh sieves which can in turn be produced from all common materials used for such sieves, e.g. plastics or metal, preferably stainless steel, and which have the exactly defined mesh sizes. Therein, the bottom comprising the sieve of the sieve device can be rigidly connected to the sieve module, in particular the frame of the sieve module. In a particularly preferred embodiment, the bottom with integrated sieve is rigidly connected with the fitting in such a way that a unit in the form of a sieve device is formed, which can be set into the corresponding recesses in the sieve module and that a flexibility in the assembly of sieve devices in the sieve modules is thereby created. Preferably, all sieves of sieve devices of one sieve module have a common mesh size. Furthermore, bottoms for the respective fittings can also be provided as exchangeable bottom modules.

In accordance with the invention, the sieve devices can also comprise bottoms with a sieve, which are movably connected with the fittings and which are held in a position by means of a spring force, in which position they tightly seal the fittings.

In another embodiment, the bottoms closing the fittings are attached at the lower end of the fittings in a manner that they can slide, e.g. in the form of a mesh sieve. Embodiments wherein sliders or flaps are provided below the bottoms, tightly sealing the fittings thus ensuring filling of the fittings without simultaneously passing the filling good through the sieve. By means of such an assembly the fittings can be filled first, while the screening being performed in a second step after the opening of the sliders or flaps. The use of such gliders or flaps, in particular in connection with the use of a cap closing the fittings on the opposite side of the bottoms, facilitates e.g. transport and storage of already-filled sieve modules. Another important aspect in this context, in particular when using solid substances that are different from each other to be screened within a sieve module, is avoiding a cross-wise contamination (mixing of two different solid-body fractions) from one fitting of a sieve module into e.g. adjacent fittings within a sieve module. Sieve modules closed in this way can be set into the sieve device and taken from them like "cassettes".

In another preferred embodiment, the sieve device in accordance with the invention has more than one sieve module, in particular two to three, in particular two sieve modules being stacked one upon the other. The sieve devices within the respective sieve modules differ in particular by the mesh size of the sieves of the respective sieve modules diminishing from top to bottom. Preferably, the mesh size of the sieves are the same for all sieve devices within a sieve module. For special applications, however, sieve devices with various mesh sizes can be combined freely within a sieve module. In this context, the formation of sections with sieve devices of equal mesh size within a sieve module would have to be taken into consideration.

The individual sieve modules can therein be connected by means of at least one connection device, in particular by pins. Therein, these pins do not only serve to connect the individual sieve modules but also for exact positioning of the individual sieve devices of the sieve modules one upon the other and for maintaining this position during sieving.

In a particularly preferred embodiment of the sieve device wherein at least two sieve modules are stacked one upon the other, the sieve modules have fittings which are shaped in such a way that the fittings of a first sieve module, respectively, at least partially protrudes into the fittings of the second sieve module, provided below. In particular, this assembly effectively avoids the mixing of two different solid-body fractions ("cross wise contamination") when the substances to be screened are transferred from a fitting of the first sieve module into the fitting positioned below or the adjacent fitting of the second sieve module.

In accordance with the invention, the respective bottoms with sieve of the fittings can be opened and/or closed individually, preferably automated, preferably by means of a discharge mechanism.

The device in accordance with the invention, in particular the embodiment with more than one sieve module, may further comprise at least one of the two devices (a) and (b):
  (a) receiving device for receiving the at least two solid substances that are different from each other after the process of screening;
  (b) closing device for closing the sieve device.

In order to better transfer the at least two different solid substances which are present in the desired particle size after screening by means of the sieve device in accordance with the present invention, a transfer module can be used in accordance with the invention. Accordingly, the present invention also relates to a transfer module for transferring the at least two solid substances present in a sieve module into appropriate receiving devices, wherein the transfer module is provided with several fittings for receiving the solid substances, and wherein the fittings are preferably provided with a sliding bottom.

The transfer module in accordance with the present invention comprises at least two fittings with a closing device enclosing the fittings and at least two connection elements.

The transfer module is set on the, e.g., bottom-most sieve module, if used within the framework of the present invention, containing the target fractions of the solid substances to be screened. Therein, the desired solid-substance particles are moved into the transfer module preferably by overturning, and are then transferred (discharged) into appropriate receiving or storing devices, e.g. individual containers or an assembly of individual containers.

The discharging of the transfer module can therein be achieved by the following embodiments:

Several fittings of the transfer module can be simultaneously discharged by means of an appropriate sliding technique, e.g. by sliding a punched plate or punched tape, wherein the diameter of the holes is smaller than the diameter of the openings at the lower end of the fittings of the transfer module;

discharging individual fittings of the transfer module is possible e.g. by means of a flap technique wherein a flap is secured by means of a securing device provided with recesses, e.g. a rotating disk, wherein neither the recess-through-which-the-solid substance falls into the receiving device nor the flap are provided in the center of the turning cycle, but eccentrically. In this assembly, the flap and the recess are merely stacked upon each other in one relative position and thus can be made to cover each other by rotating the securing device provided with the recess; thus, the flap opens and the fitting can be discharged. The opening of the flap can be performed by manually or automatically turning the securing device in relation to the flap. Alternatively, the fitting provided with the flap can be turned in relation to the securing device.

In another embodiment, the bottoms or flaps of the fittings can be automatically opened purposefully and selectively individual, thus making the direct filling of the target fractions of the products into the target containers possible. This embodiment makes it possible to perform the entire sieving off and filling process completely automatically. Of course it is also possible to automatically open all fittings at one time.

The afore-mentioned discharge devices or mechanisms can either be provided or integrated in the bottoms of the fittings of the sieve devices within the sieve modules of the sieve device of the present invention, or they can be provided as elements of the transfer module on the bottom of the corresponding fittings of the transfer module, which transfer module is also useable within the framework of the present invention.

In accordance with the invention, the sieve device may comprise an emptying mechanism which has at least one trigger, at least one spring and at least one engaging device for fixing the trigger to defined positions.

By means of the sieve device of the present invention, it is possible to screen, in principle, all solid substances where an equal range of particle sizes for later use or, in their use as an intermediate product, for production of the final product is of interest. To be mentioned individually: Support materials for heterogeneous catalyst such as metal oxides, activated carbon, zeolite; supported catalyst in itself, e.g.

support bodies soaked with e.g. metal salt solutions, which may have been processed further after steeping, e.g. reduced or oxidized, as well as dried and calcined, as well as other functional materials from the fields of electronics, electro-technologies, building-material techniques, combustion techniques, ore, minerals, solid organic substances, and many more; granulates form the fields of nutrients, foods, nutriment additives, medicine and cosmetics.

Thus, the present invention also relates to a method for producing supported building blocks, in particular supported catalyst wherein the support material is screened by means of the present invention.

The present invention is therein also explained in more detail according to the enclosed figures, wherein FIG. 1 is a side view of a sieve device in accordance with the present invention with 3 sieve modules, as well as receiving device and closing device;

FIG. 6 shows a further discharge mechanism;

Figure 1:
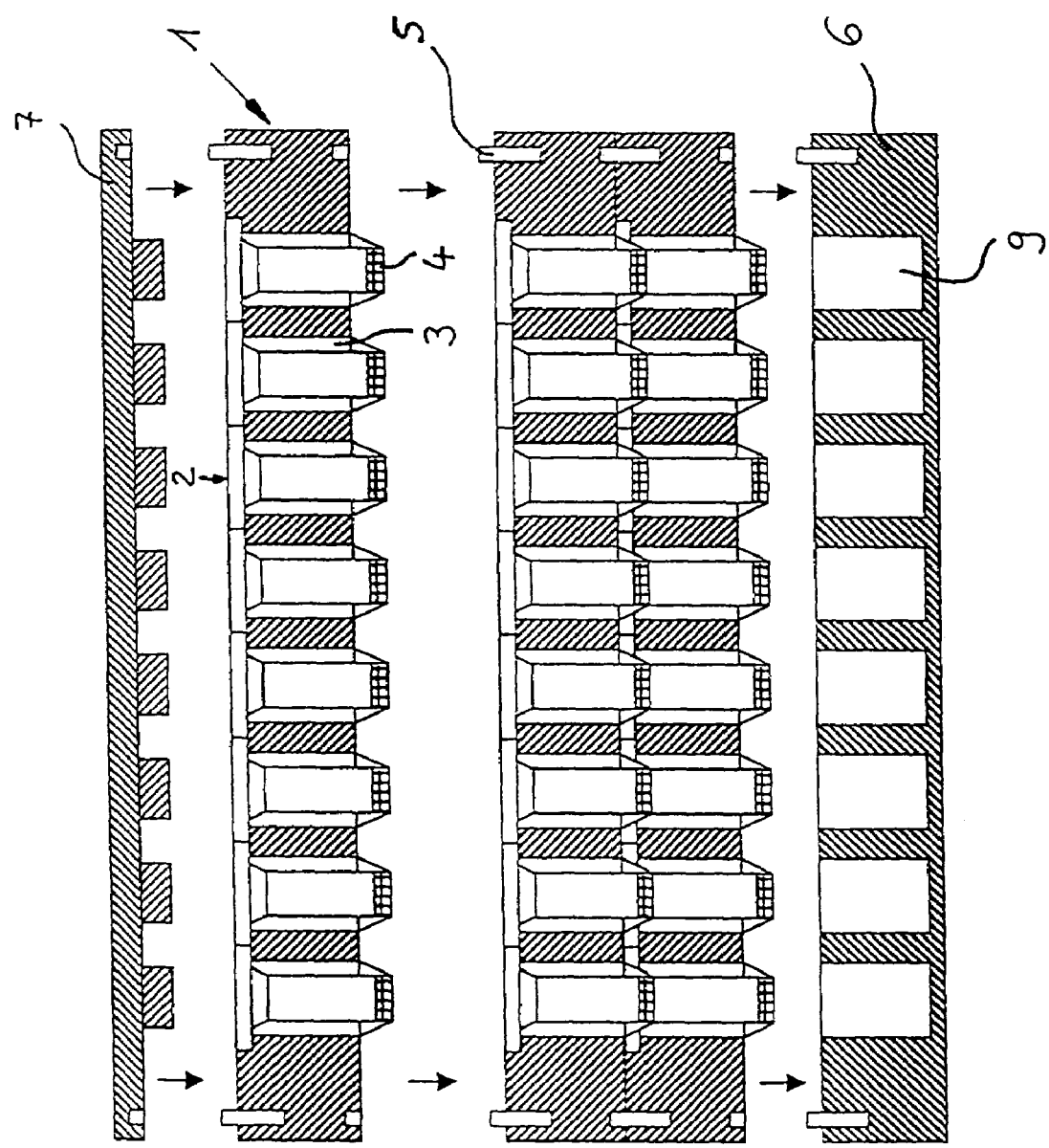

FIG. 1 shows an embodiment of the sieve device in accordance with the invention having three sieve module 1, a receiving device 6 and a closing device 7. A number of sieve devices 2, preferably in the form of a matrix (cf. FIG. 2) are set into the sieve module 1. A sieve device 2 comprises of a fitting 3 and a bottom with sieve 4.

By means of connection devices 5 provided preferably at the sides of the frame of the sieve modules 1, e.g. as pins, the individual sieve modules 1, which can be stacked one upon the other, can be positioned exactly one above the other.

The sieve modules 1, which can be stacked, differ one from the other by the mesh size of the sieves 4 wherein the mesh sizes are preferably larger in the upper sieve module 1 than in the sieve module 1 provided there-below. The mesh size of the sieves 4 within a sieve module 1 is preferably equal.

As also obvious from FIG. 1, the fittings 3 of the respective sieve module 1, which is provided further towards the top, protrudes partially into the fittings 3 of the respective sieve module 1, provided further below, after two sieve modules 1 have been connected. In contrast to common sieving machines, this provides the advantage of no material from a certain fitting 3 of a sieve module 1 entering into the adjacent fittings 3 of the same sieve module 1 or the adjacent fittings 3 of the fitting 3 provided below the specified fitting 3 and being part of the sieve module 1 being provided below.

For better securing the sieve devices 2 in the sieve module 1, the fittings 3 can be provided with flanges at the side opposite to the bottom with sieve 4. The flanges are taken up by the corresponding recesses in the sieve module 1 in such a way that, after insetting of the sieve device 2 into the sieve module 1, a planar surface is created, avoiding a cross-wise contamination after connecting two sieve modules 1, as described above.

The sieve device in accordance with the invention is provided in this embodiment below the bottom sieve module 1 with a receiving device 6, which is preferably provided with receiving containers 9, corresponding to the number and position of the sieve devices of the bottom-most sieve module 1. The receiving containers 9 can in turn be provided with sliders or flaps with appropriate movement mechanics on their bottom side in order to enable the discharging of the receiving containers 9 manually or automatically in a purposeful way of individual receiving containers 9 or of all the receiving containers 9 of the receiving device 6.

The uppermost sieve module 1 of the sieve device is preferably limited by a closing device 7, e.g. as a tightly sealing cover. The process of sieving itself is preferably supported by e.g. mechanical jolting or shaking. Thus, providing a closing device 7 is necessary in order to avoid a cross-wise contamination within the uppermost sieve module 1 from one fitting 3 to other fittings 3.

Figure 2:
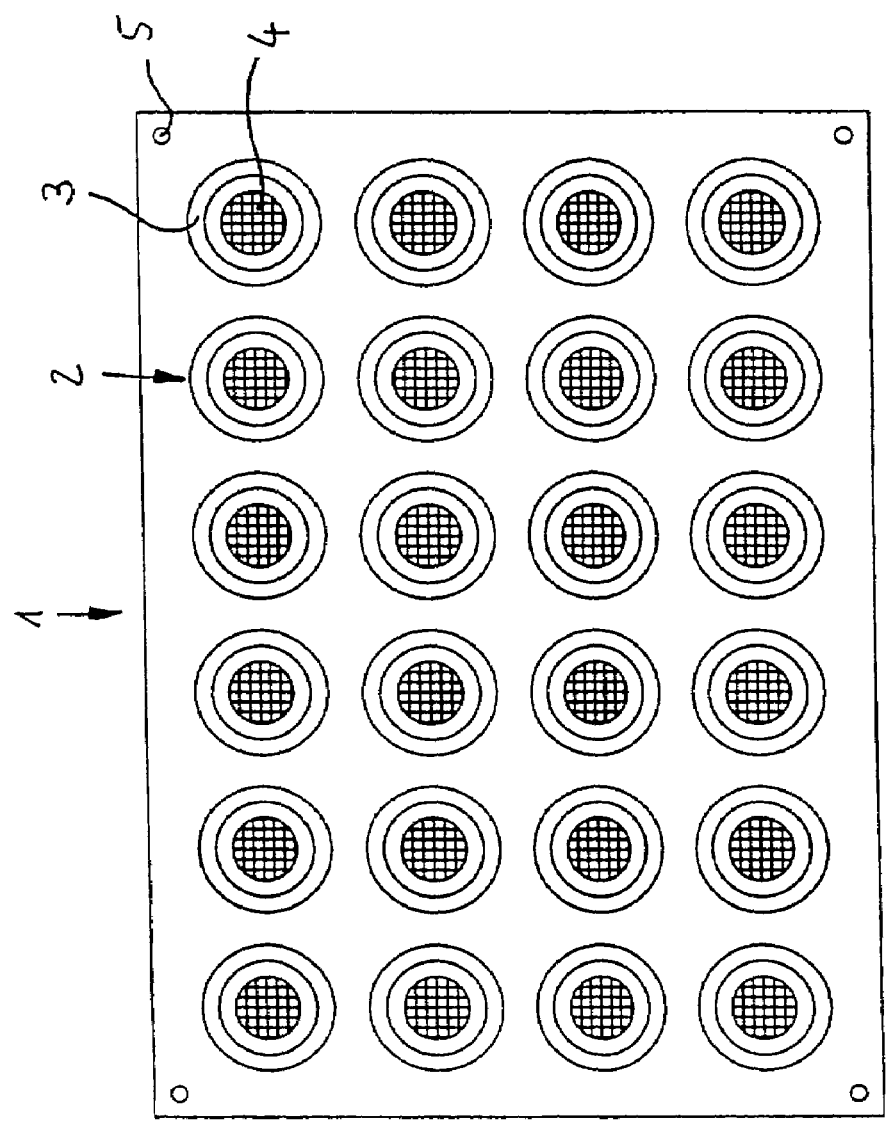
FIG. 2 is a plane view of a 24-fold sieve module.

FIG. 2 shows a sieve module 1 with 24 sieve devices 2, assembled in the form of a 6×4 matrix. In the frame corners of the sieve module 1, four connection devices, 5 in the form of pins, are provided in this embodiment.

Figure 3:
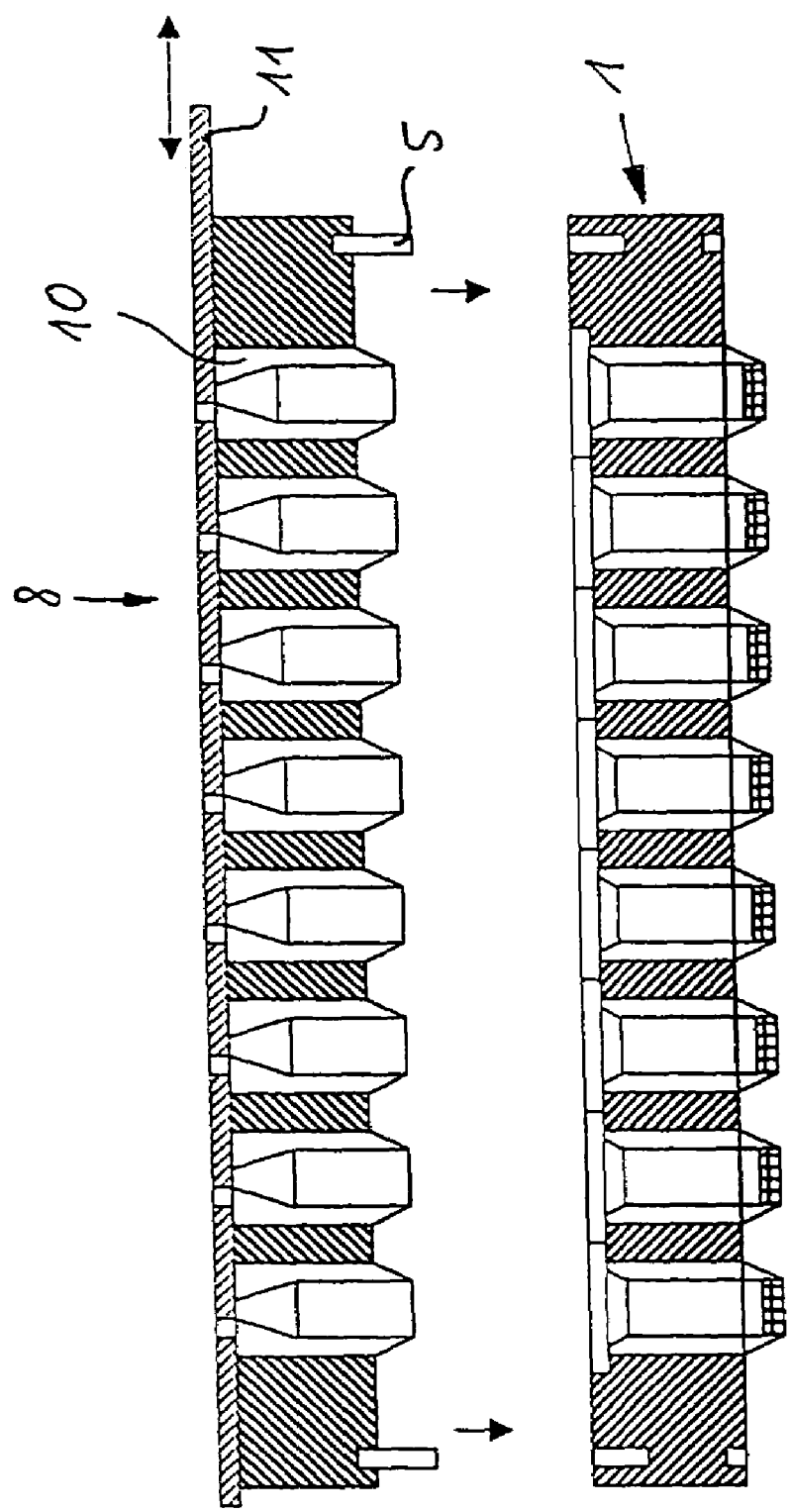
FIG. 3 shows a transfer module, useable in accordance with the present invention, being set onto a sieve module.

A transfer module 8 as in FIG. 3 is particularly advantageous for the emptying sieve modules 1 provided above the lowest sieve module 1 (transfer of the screened substances from the sieve module 1 into appropriate containers for further processing of the substances). The transfer module 8 is also provided with fittings 10, with their position and number corresponding to those of the sieve module 1 to be emptied. The fittings 10 in turn are provided with two openings opposite to each other, wherein one of them is closable by means of appropriate closing devices 11, e.g. a slider with openings or a flap.

The transfer module 8 is set onto a sieve module 1 for emptying said sieve module 1 like a further sieve module 1, wherein the open sides of the fittings 10 of the transfer module 8 protrude into the open sides of the fittings 3 of the sieve module 1. The exact positioning of the transfer module 8 on the sieve module 1 to be emptied is also effected by means of connection devices 5, being provided at the same positions as those of the sieve modules and which are taken in by corresponding recesses in the sieve module 1 when setting the transfer module 8 onto a sieve module 1.

After setting the transfer module 8 onto a sieve module 1, the e.g. solid substance particles present in the fittings 3 of the sieve module 1 are moved into the corresponding fittings 10 of the transfer module 8 by overturning this unit of sieve module 1 and transfer module 8 (turning by 180 degree).

Figure 4:
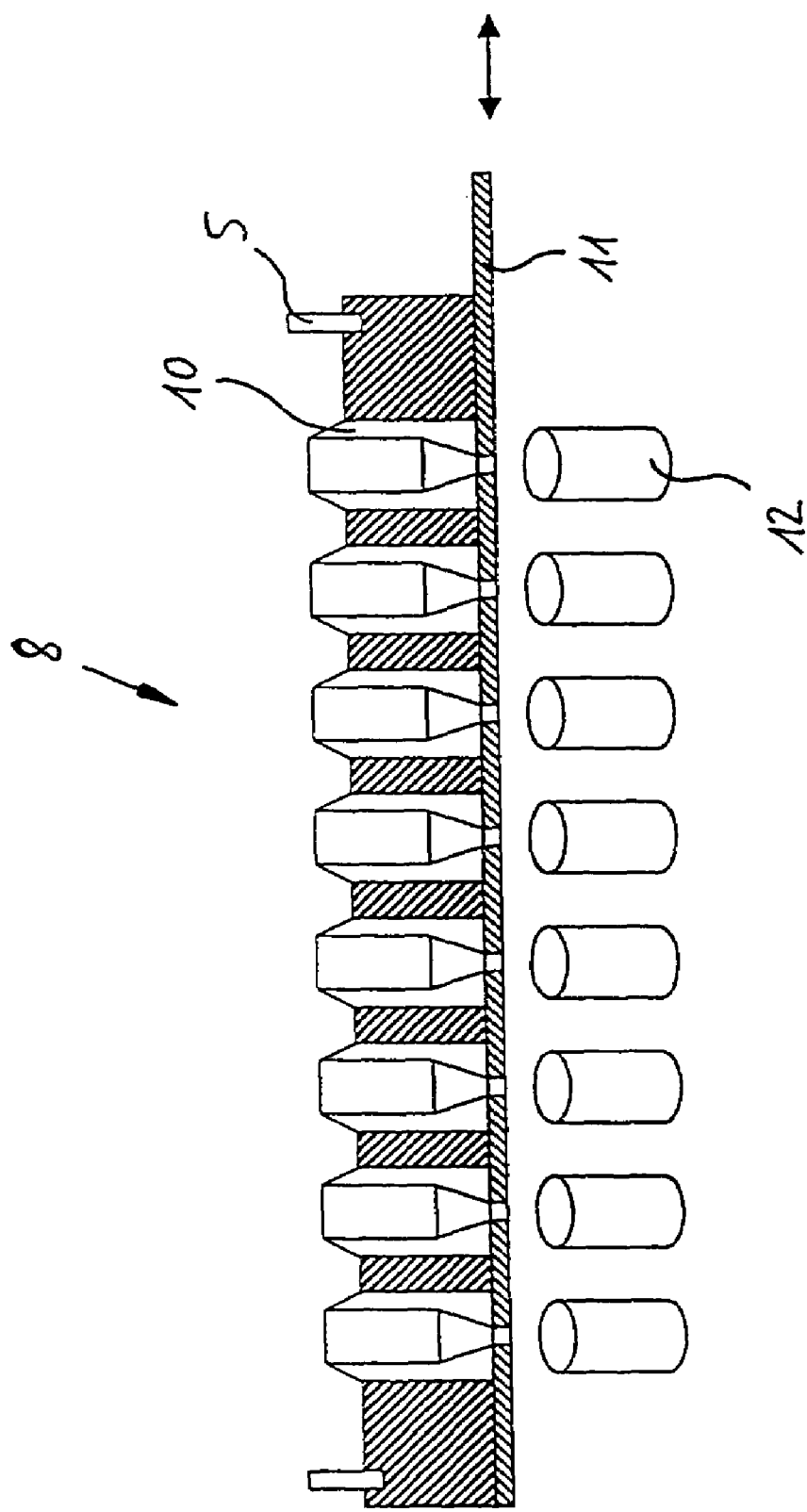
FIG. 4 shows filling of the solid substances obtained form the transfer module into appropriate receiving devices.

After taking the emptied sieve module 1 off the transfer module 8, this can be set onto a receiving device 6 for discharging the fittings 10, e.g. in an assembly of individual containers 12, which preferably corresponds to the assembly of the fittings 10 of the transfer module 8. By actuating the closing device 11, the fittings 10 can preferably be opened all at the same time, thus causing a transfer of the contents of the fittings 10 into the containers 12 (FIG. 4).

Figure 5C:
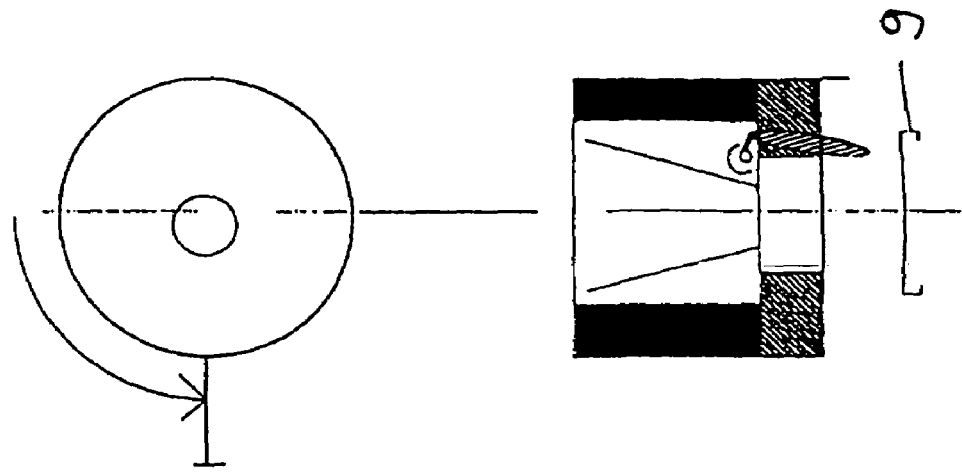
FIG. 5 shows the function of a discharge mechanism of an individual fitting, usable in accordance with the present invention, by means of a flap technique.
Figure 5B:
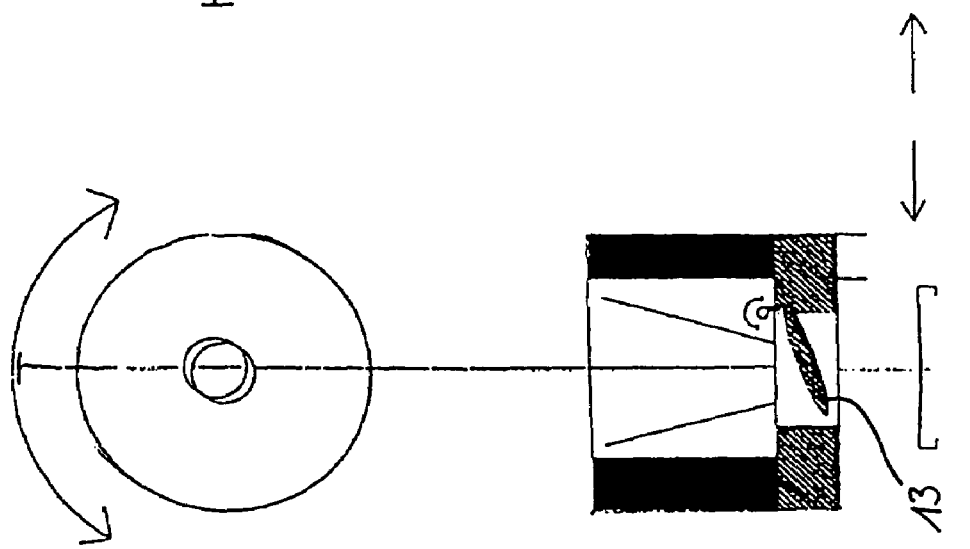
Figure 5A:
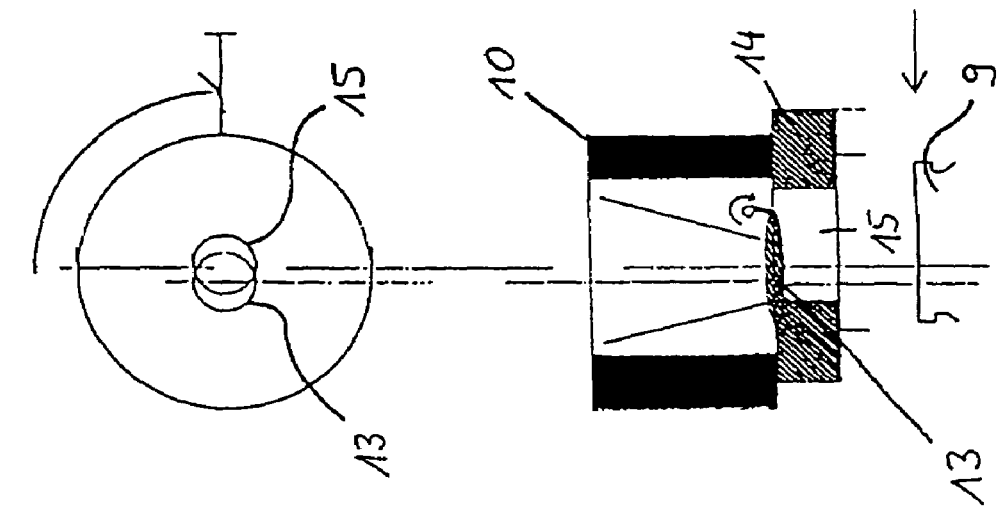

The FIGS. 5a, 5b, and 5c show a further possibility of an emptying mechanism in the form of a flap technique which is preferably used as a closing device 11 of the fittings 10 of the transfer module 8. In particular this embodiment enables a purposeful emptying of individual fittings 10 either manually or automatically.

In this flap technique, a flap 13 is secured by means of a securing device 14, e.g. a rotating disk, provided with recesses 15, wherein neither the recess 15 through which the solid substance falls into the receiving containers 9, nor the flap 13 are provided in the center of the rotation cycle, but are provided eccentrically (FIG. 5*a*). In this assembly, the flap 13 and the recess 15 are only provided one on top of each other in a relative position (FIG. 5*c*) and thus can be made to cover each other by rotating the securing device 14 provided with the recess 15 (FIG. 5*b*); thus, the flap 13 is opened and the recess 10 can be emptied (FIG. 5*c*). Opening the flap 13 can be effected by manually or automatically turning the securing device 14 with relation to the flap 13. Alternatively, the fitting 10, provided with the flap 13 can be turned relatively to the securing device 14. Alternatively, the flap 13 can also be opened and closed by means of a displacement element, e.g. a slider (not shown in FIGS. 5*a–c*) instead of the securing device 14.

In another embodiment, shown in FIG. 6, the bottoms with sieve 4 of the fittings 3 of a sieve device 2 can be opened in a purposeful way and selectively as individuals, either automatically or manually, so that a direct filling of the target fraction of the products into the target containers is possible. This embodiment makes it possible to perform the whole sieving and filling process completely automatically. An automatic opening of all fittings 3 at the same time is, of course, also possible.

In this embodiment, preferably every sieve device 2 has an additional mechanism for opening the bottom with sieve 4. The bottom with sieve 4 is therein preferably comprised of a sieve carrier 16, the net-shaped sieve 4 and a clamping ring 17, with which the sieve 4 is secured on the sieve carrier 16.

The sieve carrier 16 is preferably rotatably positioned on a trigger 19 by means of a pin 18. The trigger 19 is part of the mechanism for opening the bottom with sieve 4 which comprises at least a spring 20, a screw 21 and a disk 23. The mechanism for opening, more exactly for axial displacement and securing of the trigger 19, can be compared to the mechanism which is used for the axial displacement and securing of a ball-point-pen cartridge with in a ball point pen. Therein, the trigger 19 has two positions, wherein the first position presses the bottom with sieve by means of the force of spring 20, e.g. a cylindrical coil spring, against the fitting 3 from below in such a way that this fitting is closed by the bottom with sieve 4. The second position of the trigger 19, shown in FIG. 6, wherein the spring 20 is further pressed and the trigger 19 further protrudes downwards from out of the fitting 3, makes it possible for the bottom with sieve 4 to pivot downwards due to its gravitational force and thus to open the fitting 3 for e.g. emptying. In order to close the bottom with sieve 4, the trigger 19 is returned to its first position, thus pressing the bottom with sieve 4 one-sidedly against the fitting 3 by means of a spring force. A complete closing of the bottom with sieve 4 can then e.g. be performed by displacing the receiving device 6 in relation to the fitting 3 wherein the receiving device 6 is displaced in such a way that the continuous contact of the bottom with sieve 4 during the displacement closes it completely; by the spring force acting on the bottom with spring 4 via the trigger 19, it is secured in the position closing the fitting 3 even after the receiving device 6 has been removed. Of course, an embodiment wherein the sieve module 1 with the fittings 3 is displaced relatively to the receiving device 6 is also possible.

Prestressing the spring 20 with the screw 21 can cause the force to be provided by the spring 20 for receiving the substances to be sieved, which is necessary in order to avoid opening of the bottom with sieve 4 as early as during filling of the fitting 3 or during the sieving. The disk 23 is therein used as a counter part for the end of the spring 20 facing the screw 21 and guarantees setting of the prestressing force without additional turning of the spring 20 and without jerking. When the bottom with sieve 4 is closed [first position of trigger 19], the position of the sieve carrier 16 relative to the fitting 3 can be additionally secured by means of a centering pin 22.

Alternatively to the above described mechanism for opening the bottom with sieve 4, further opening mechanisms are realizable, wherein e.g. the bottom with sieve 4 is also one-sidedly rotatably positioned on the fitting 3 by means of a pin, wherein the rotatable bedding is provided with at least one additional leg spring guided on the pin, which is "chucked" or secured both to the fitting and to the bottom with sieve 4. Therein, the leg spring is prestressed in such a way that that the spring force is sufficient for pressing the bottom with sieve 4 tightly against the fitting 3, even when actuated upon by the sieving good's weight. In order to open the bottom with sieve 4, e.g. a pin, engaging a continuous recess of the fitting 3, may be used. This pin is manually or automatically displaced in an axial direction of the bottom with sieve 4 in order to open the fitting 3, and presses it away from the fitting 3 in the opposite direction of the spring force so that emptying the fitting 3 is possible. Closing the fitting 3 is effected by returning the pin into its initial position (fitting closed), thus sliding the bottom with sieve 4 back into its initial position due to the spring force actuating against the sliding opening direction; the fitting 3 is closed.

Moreover, embodiments of the opening mechanism are possible which are realized without springs, e.g. by means of the bottom with sieve 4 also being one-sidedly positioned in a slideable way on the fitting 3, wherein opening and closing the bottom is effected by e.g. a rope, a belt, a chain or something similar, which is secured on that side of the bottom which is opposed to the slideable bedding, and wherein winding up and down the rope, belt etc. lifts or lowers the bottom with sieve 4, thus closing or opening the fitting 3. The mechanism, e.g. an electric motor for winding up and down, in particular if automatically performing, can be provided within the fitting 3 as is the case of the mechanism of FIG. 6. The afore-described mechanisms for opening and/or closing can also comprise magnetic components such as one or more electromagnets or permanent magnets. E.g. an embodiment is possible wherein the bottom with sieve 5 is positioned on the fitting 3 to be one-sidedly slideable and is secured in a position closing the fitting 3 on the side opposite to the bedding by means of an electromagnet. In order to open, merely the power supply of the electromagnet would have to be interrupted. Closing can then in turn be performed by sliding the receiving device 6 or the sieve module 1, as already described above.

Further possible embodiments of the device in accordance with the invention may relate to the entire device or even to individual parts of the whole device, such as the sieve module 1 or the sieve device 2.

The geometric form of the sieve device, the sieve module 1 and the sieve device 2 are not limited. Therein, a form is preferred wherein the partial or entire automation is advantageous and/or which improves or facilitates sieving.

In particular the form of the fittings 3 in the sieve devices 2 is not limited. The fittings 3 may have polygonal or ellipsoid base areas. Therein, polygonal areas can realize very large sieve areas with regard to the total surface of the sieve device 2.

In a special embodiment (FIG. 7), the fittings 3 are polygonal or ellipsoid and have an opening 24 on one side. Thus, sieving over the entire length of the sieving area is possible wherein the sieve fraction is transferred directly into the receiving device 6, also in accordance with the invention, at the other end and via the opening 24. This embodiment enables the device of the present invention to perform as a sieve cascade, wherein the individual fractions are directly caught in a receiving device 6 by tilting the sieve module 1 by z and opening at least one flap 25. Sieving is preferably performed by vibration and shaking of the sieve module 1 in x-y direction.

Figure 7:
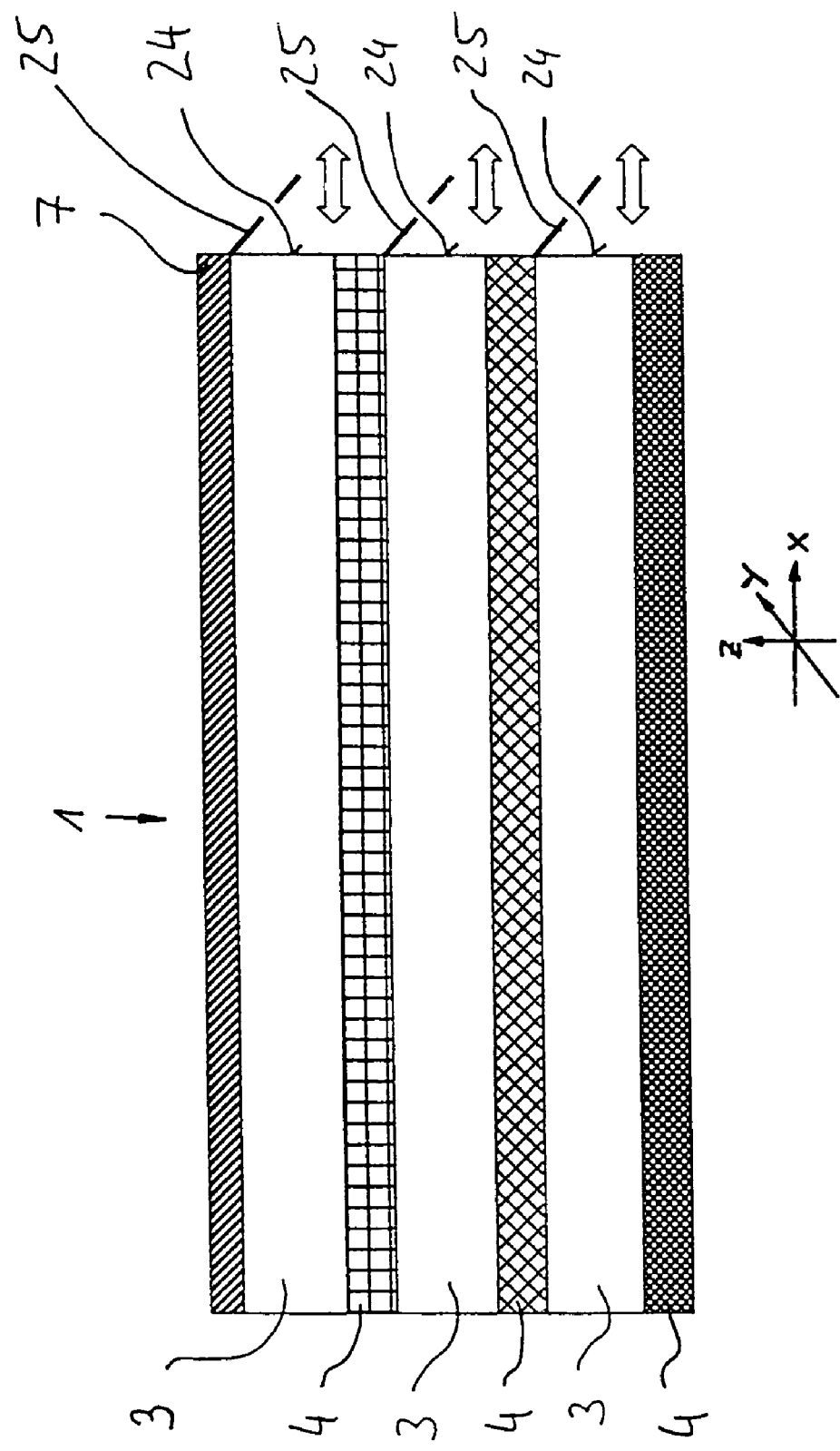
FIG. 7 is a side view of another embodiment of a sieve device with discharge openings provided at the sides thereof.
Figure 8:
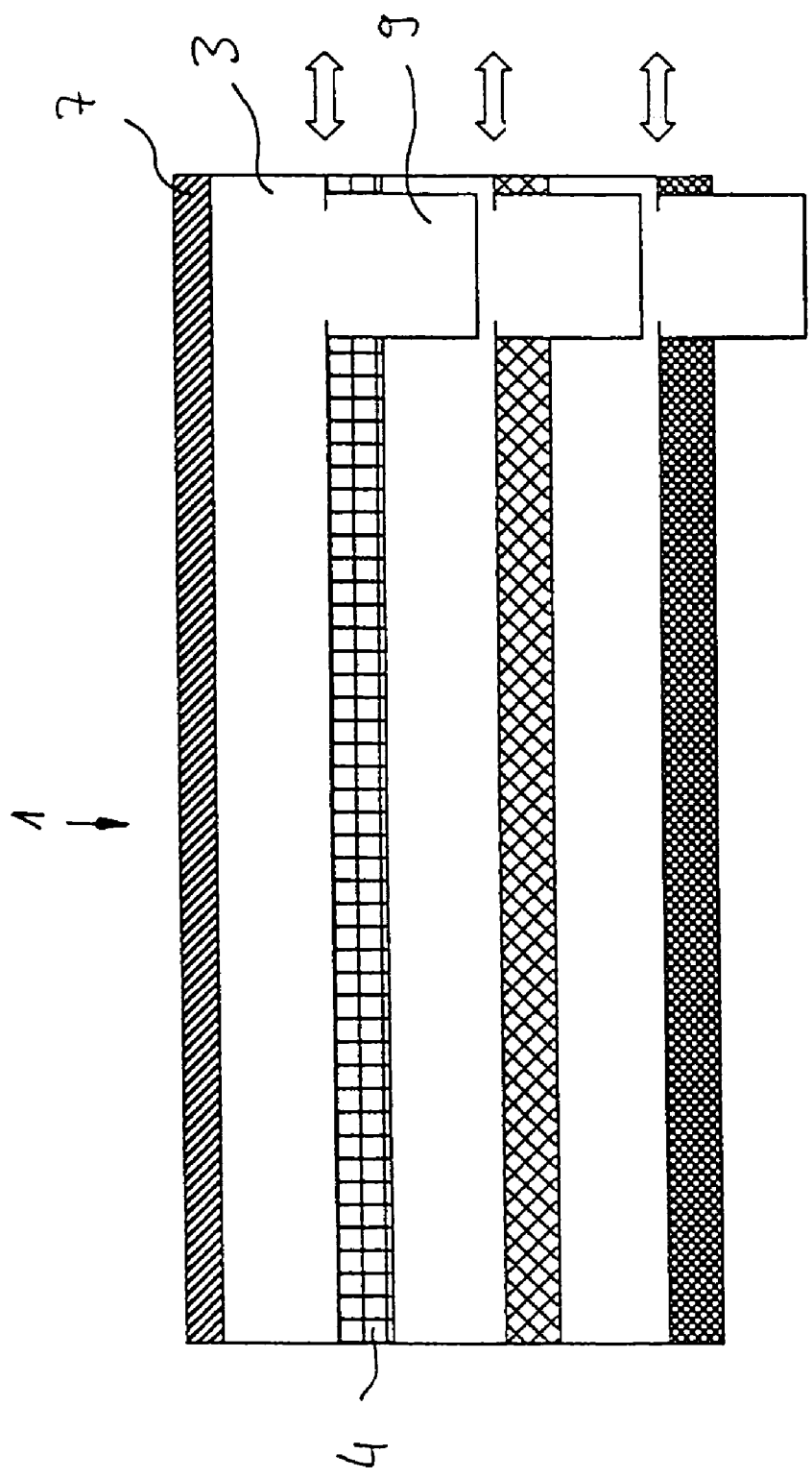
FIG. 8 is a side view of a further embodiment of a sieve device with discharge openings provided in the sieve surface.

FIG. 8 shows a further embodiment of a sieve module 1 in accordance with the invention with a similar construction as the one in FIG. 7, with the difference that the receiving containers 9 are integrated into the sieve area.

Figure 9:
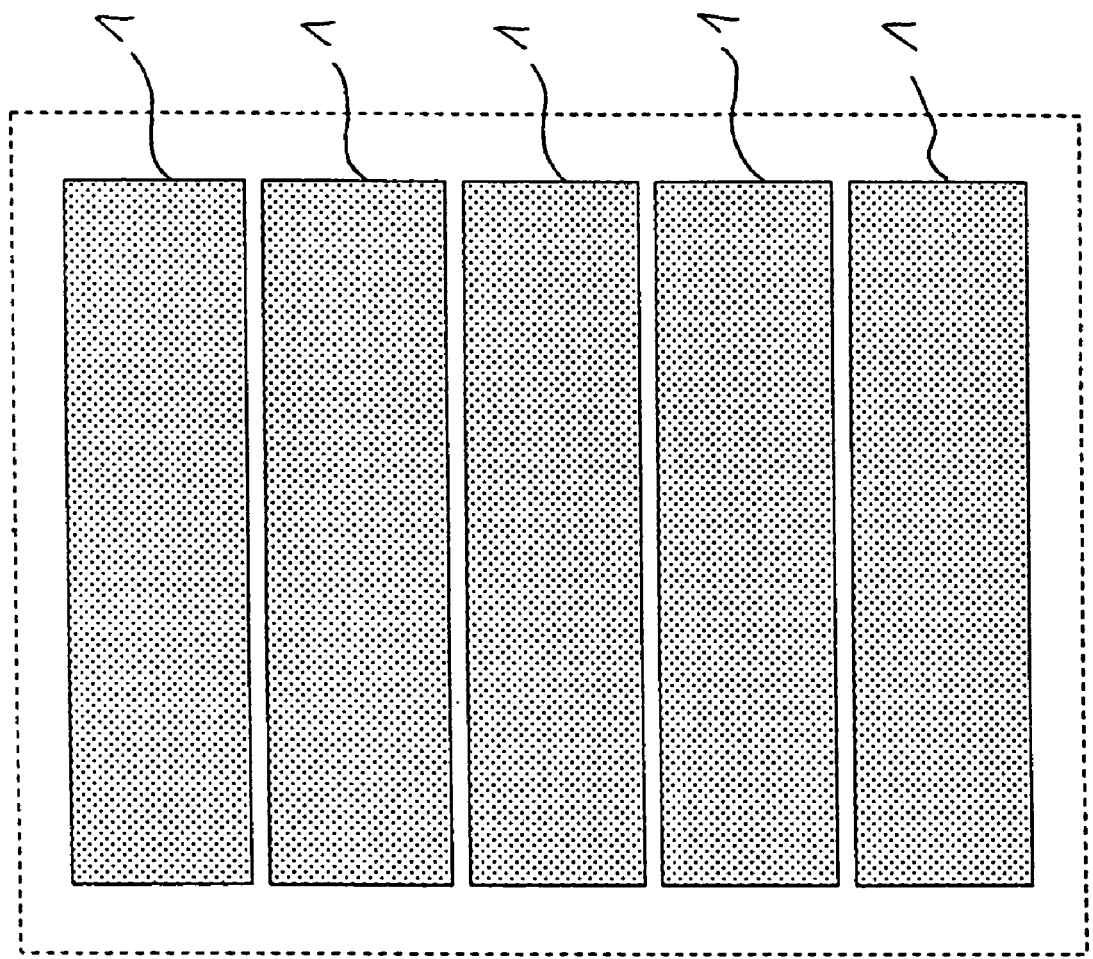
FIG. 9 is a plane top view of sieve devices such as in FIGS. 7 and 8.

FIG. 9 shows a possible assembly of the sieve modules as per FIGS. 7 and 8. The framework represented by a broken line illustrates a receiving area for securing the sieve modules 1.

Figure 10:
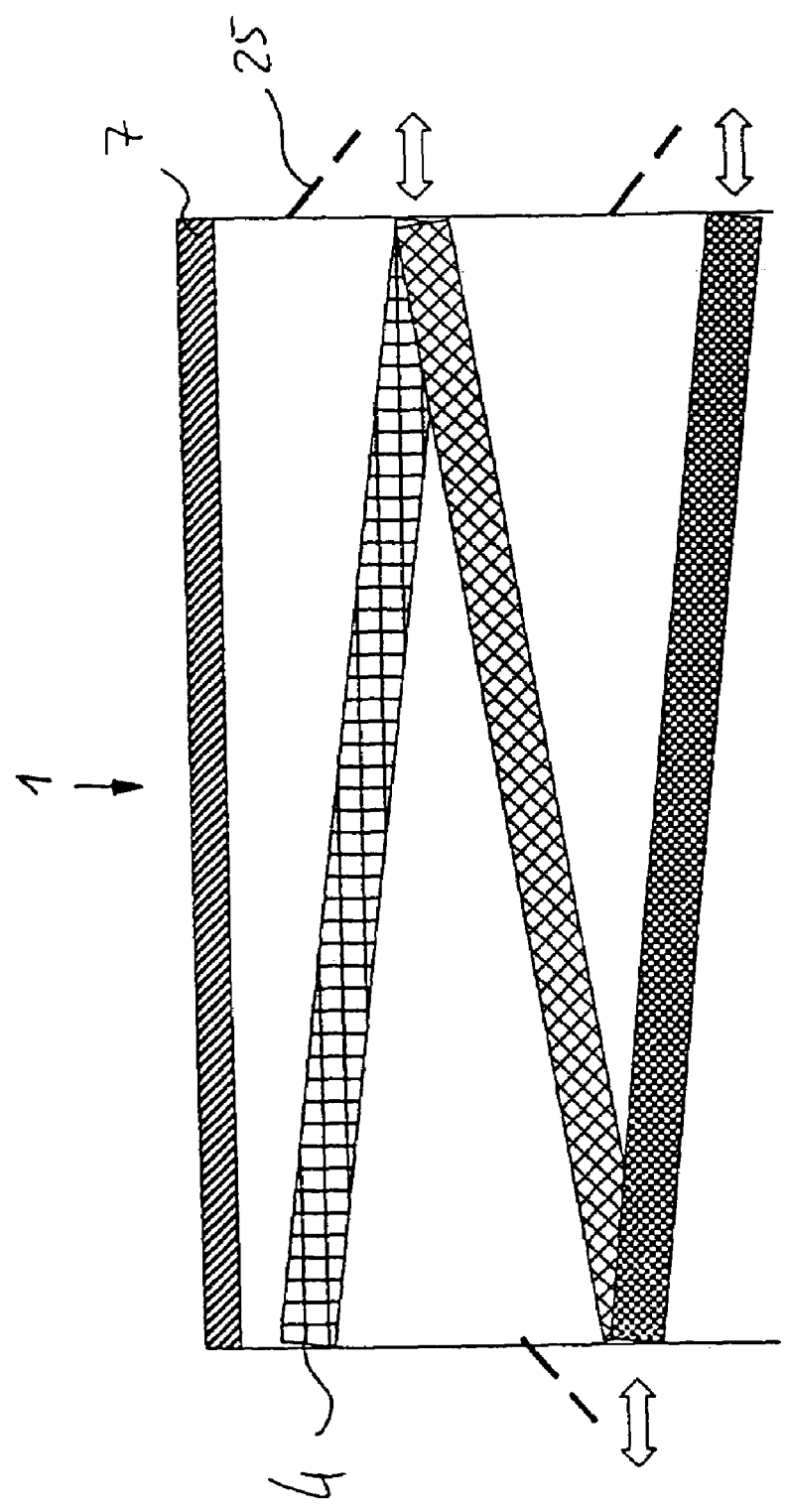
FIG. 10 shows an alternative embodiment of the sieve device of FIG. 7 with tilted sieve surfaces.

FIG. 10 shows an alternative of the sieve module 1 shown in FIG. 7, wherein the sieve surfaces are tilted, and, if viewed from the side, provided in a zigzag form. This embodiment makes simultaneous receiving and/or discharging of the individual sieve fractions, e.g. for further processing.

The movements of the sieve device in sieving solid substances may be even or uneven oscillations, joggling, shaking, vibrations or combinations of various kinds of movements. The main movement axes of the movement for sieving the sieve good are not preset. For an improved crushing of a material fraction, bodies such as ceramics bodies, metal bodies or all other bodies known to the person skilled in the art may be applied on the sieve together with the sieving good. Depending on the hardness and mass of the object, setting the size of certain grain fractions can be influenced.

By blowing in air or other gases, operations such as air separation or removal of fine dust can be performed.

The sieve surface in a fitting is not limited. Typically it ranges between 0.1 cm$^2$ and 10 m$^2$. The sieve surface is adjusted to the amount of sieving good within the respective inlet, as is known to the expert.

The material, of which the sieve is made, is also not limited. Metals, fibers of ceramics, glass or polymer fibers, known to the person skilled in the art, may be used. The form of mesh formation is also not limited.

LIST OF REFERENCES 1. sieve module
2. sieve device
3. fitting
4. bottom with sieve
5. connection device
6. receiving device
7. closing device
8. transfer module
9. receiving container
10. fitting
11. closing device
12. individual container
13. flap
14. securing device
15. recess
16. sieve carrier
17. clamping ring
18. pin
19. trigger
20. spring
21. screw
22. centering pin
23. disk
24. opening
25. cover

The invention claimed is:

1. An apparatus for screening at least two solid substances that are different in size from each other, comprising:
   a stack of sieve modules configured as platforms with devices that connect the platforms together during shaking or jolting of the stack, with each platform having a horizontally disposed matrix of passages extending vertically through the platform in alignment with the matrix of passages in each other platform; and
   multiple separate sieve devices in sets that correspond to the sieve modules, wherein each sieve device includes a tubular fitting installed in a passage in the corresponding sieve module, and further includes a sieve for the passage of solids at the lower end of the fitting, with the sieves in each set having a common mesh size that differs from the mesh size of each other set.

2. An apparatus as defined in claim 1 wherein each matrix of passages includes ten or more passages, and each set of sieve devices includes a like number of sieve devices.

3. An apparatus as defined in claim 1 wherein each matrix of passages includes twenty or more passages, and each set of sieve devices includes a like number of sieve devices.

4. An apparatus as defined in claim 1 wherein each matrix of passages includes forty or more passages, and each set of sieve devices includes a like number of sieve devices.

5. An apparatus as defined in claim 1 wherein each sieve is supported on the respective fitting for movement into and out of a closed position at the lower end of the fitting.

6. An apparatus as defined in claim 5 wherein each fitting has means for applying a spring force to hold the sieve in its closed position.

7. An apparatus as defined in claim 5 wherein each fitting has a spring-loaded mechanism that is shiftable between open and closed conditions in which the spring-loaded mechanism supports the sieve in its open and closed positions, respectively.

8. An apparatus as defined in claim 1 wherein each fitting on an upper platform in the stack projects downward into an aligned passage in the next lower platform in the stack.

9. An apparatus as defined in claim 1 wherein each fitting on an upper platform in the stack projects downward in to an aligned fitting on the next lower platform in the stack.

10. An apparatus as defined in claim 1 further comprising a receiving device upon which the sieve modules are stacked and connected by a connection device, with the receiving device having containers arranged in a horizontally disposed matrix corresponding to the matrix of passages in each platform.

11. An apparatus as defined in claim 1 further comprising a closing device configured to fit over the fittings on the sieve module at the top of the stack to close and isolate the upper ends of the corresponding fittings from each other.

12. An apparatus as defined in claim 11 wherein the closing device comprises a platform with downwardly projecting closing elements in a horizontally disposed matrix corresponding to the matrix of passages.

13. An apparatus as defined in claim 1 further comprising a transfer module including a transfer platform, tubular fittings supported on the transfer platform in a horizontally disposed matrix corresponding to the matrix of passages in each sieve module, a closure operative to open and close the upper ends of the transfer fittings, and a connector device configured to connect the transfer platform to a platform in a sieve module to enable the contents of the fittings on the sieve module to be transferred into the fittings on the transfer module by overturning the connected platforms.

* * * * *